Oct. 21, 1924.                                                    1,512,704
                              S. MAGNANO
           APPARATUS FOR APPLYING STOP MOTION PINS TO WARP THREADS
                       Filed July 23, 1919      9 Sheets-Sheet 8
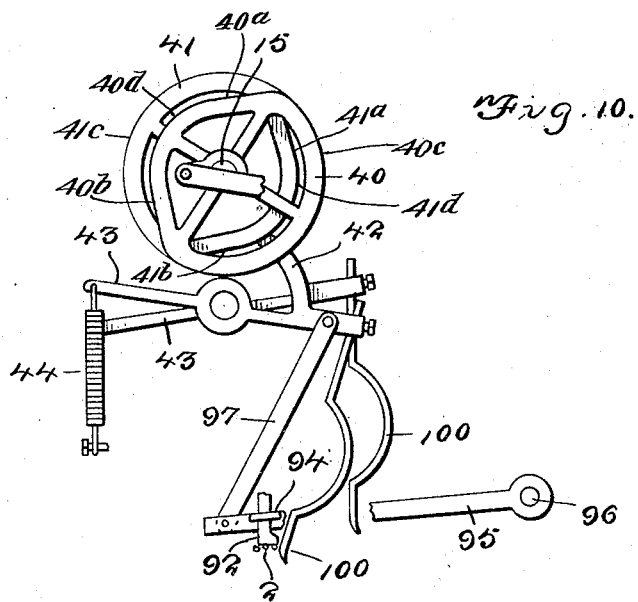
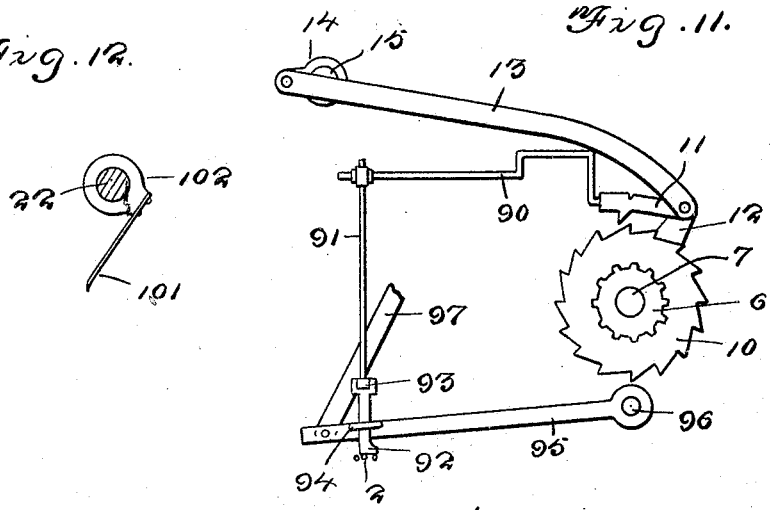
Sebastiano Magnano
INVENTOR.
BY
Victor J. Evans
ATTORNEY.

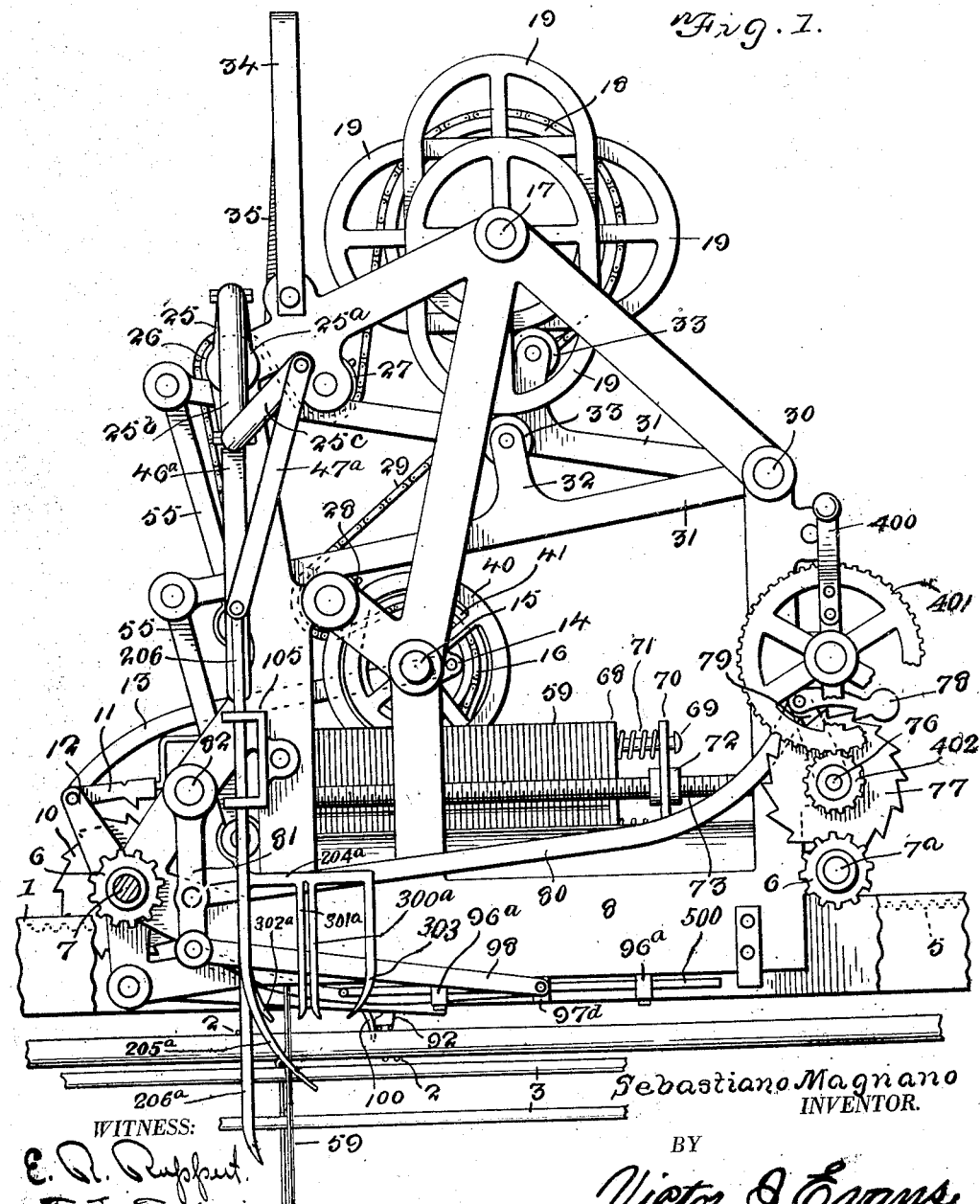

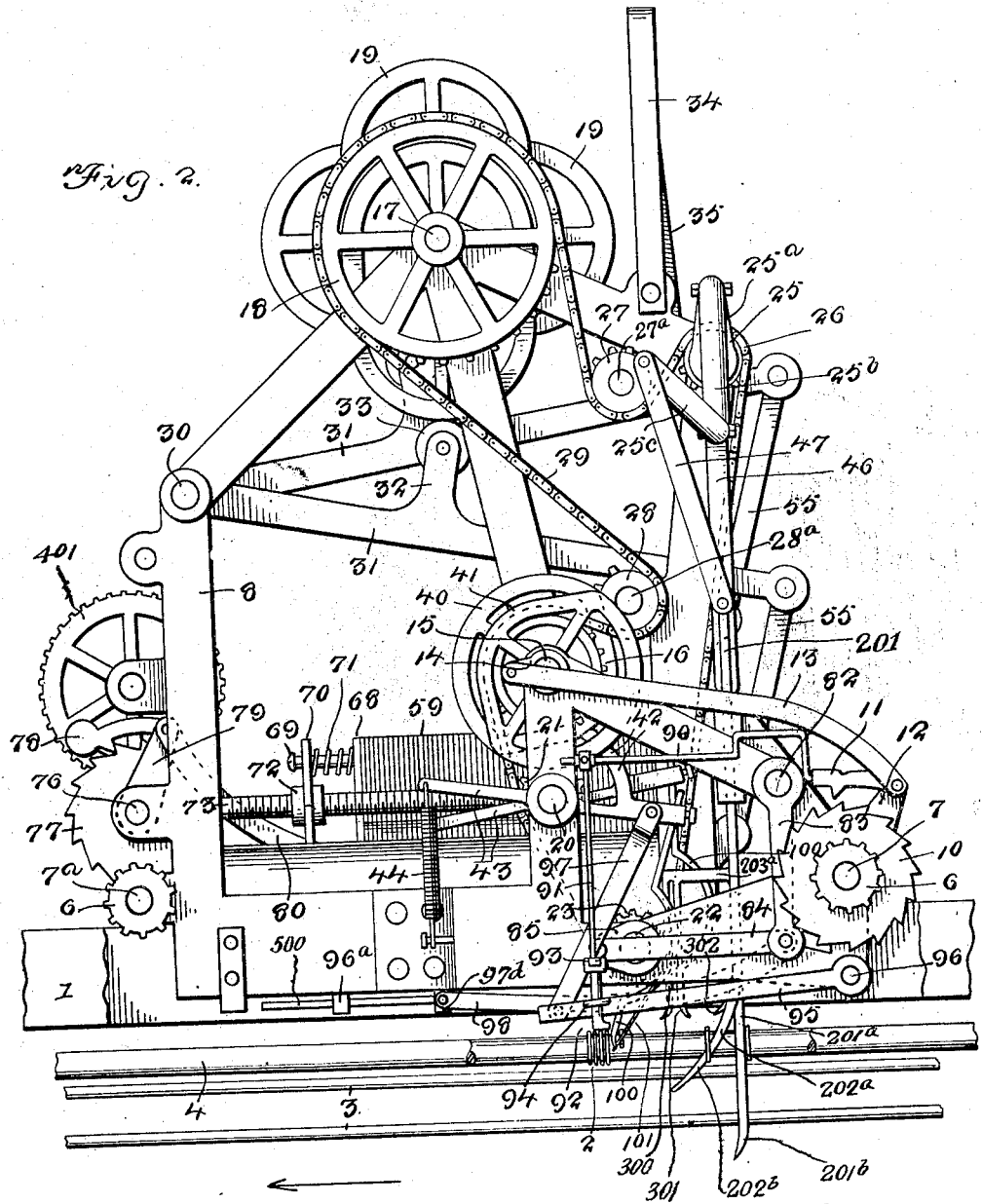

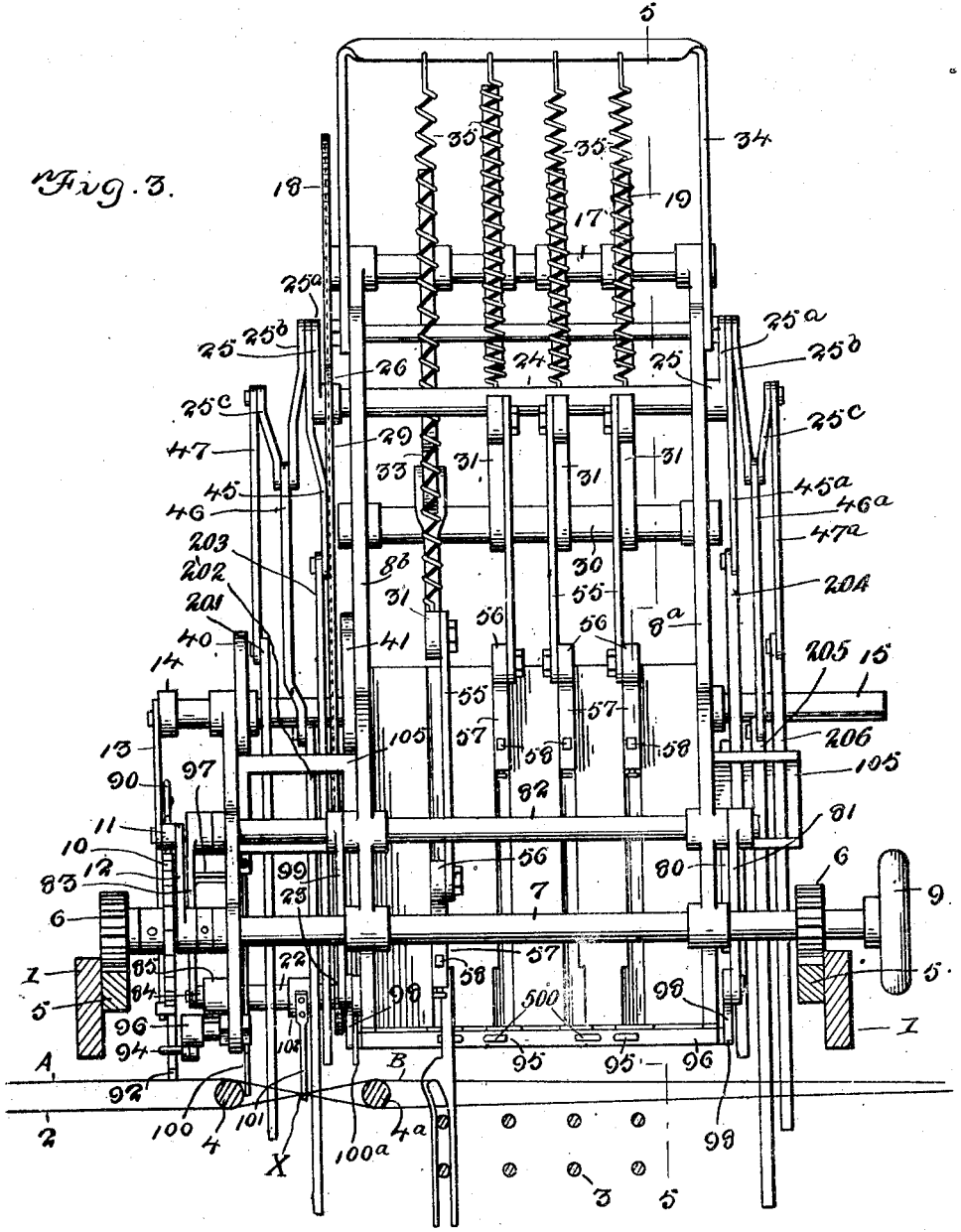

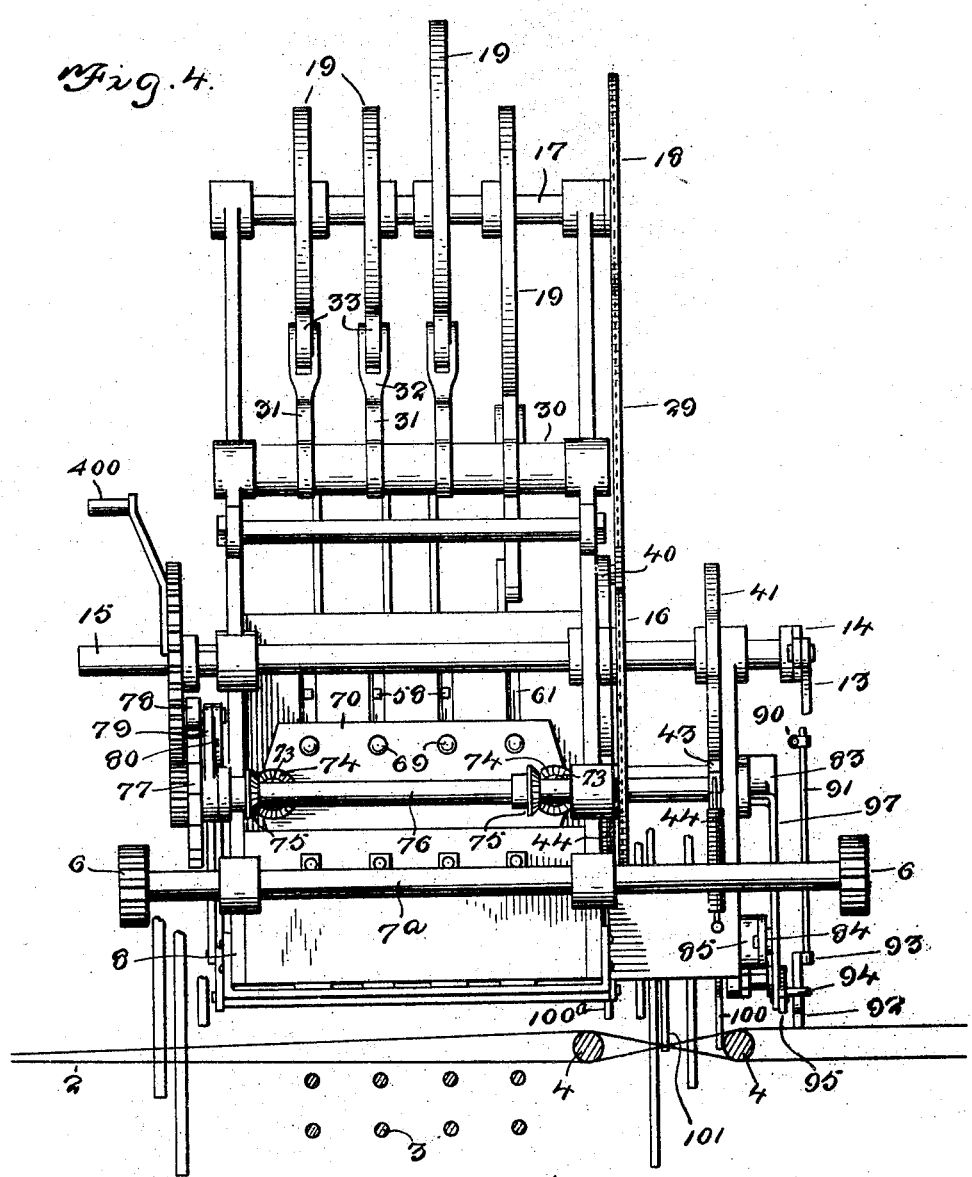

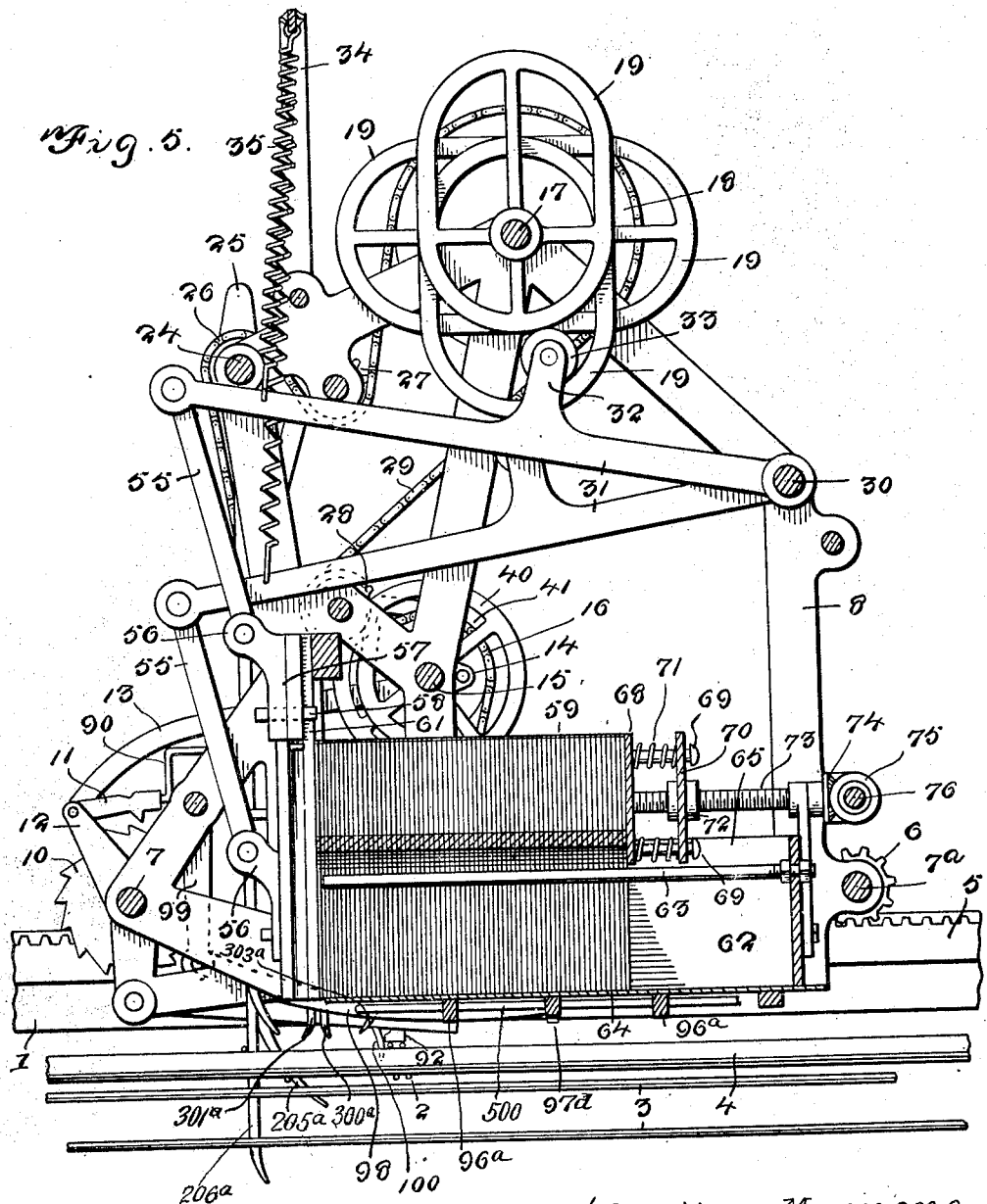

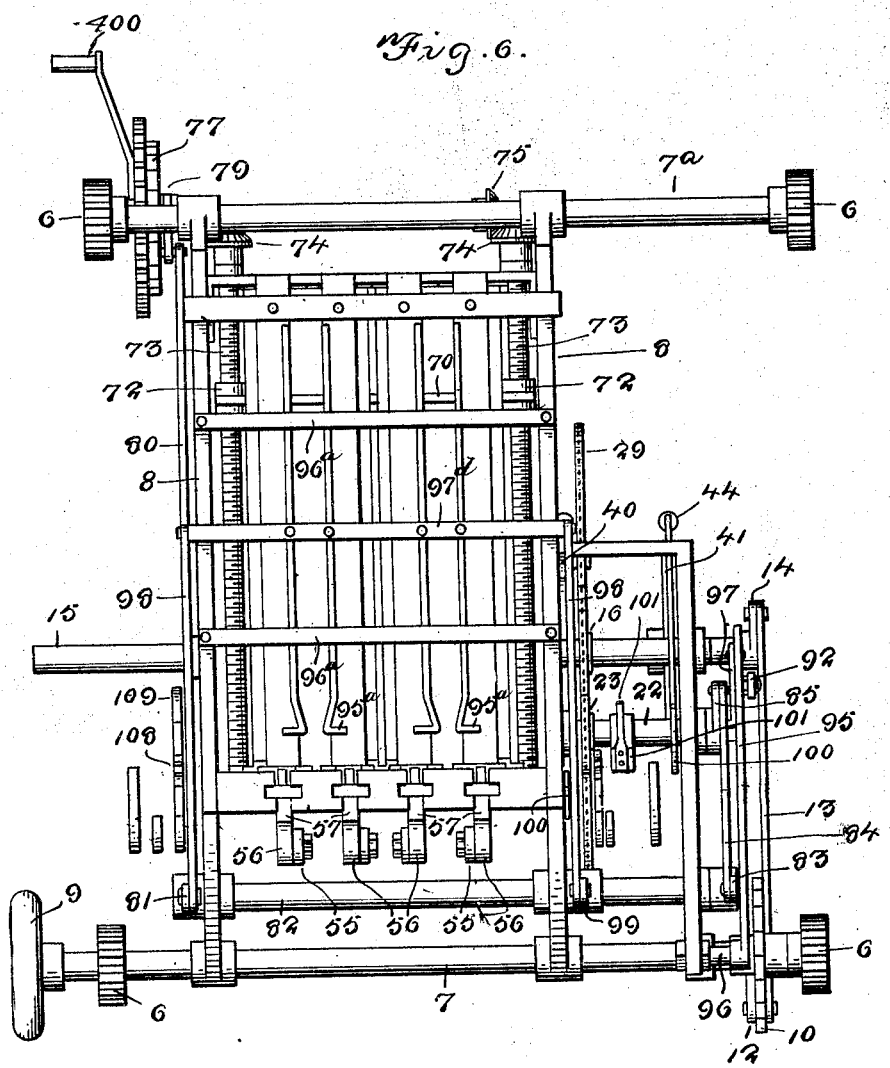

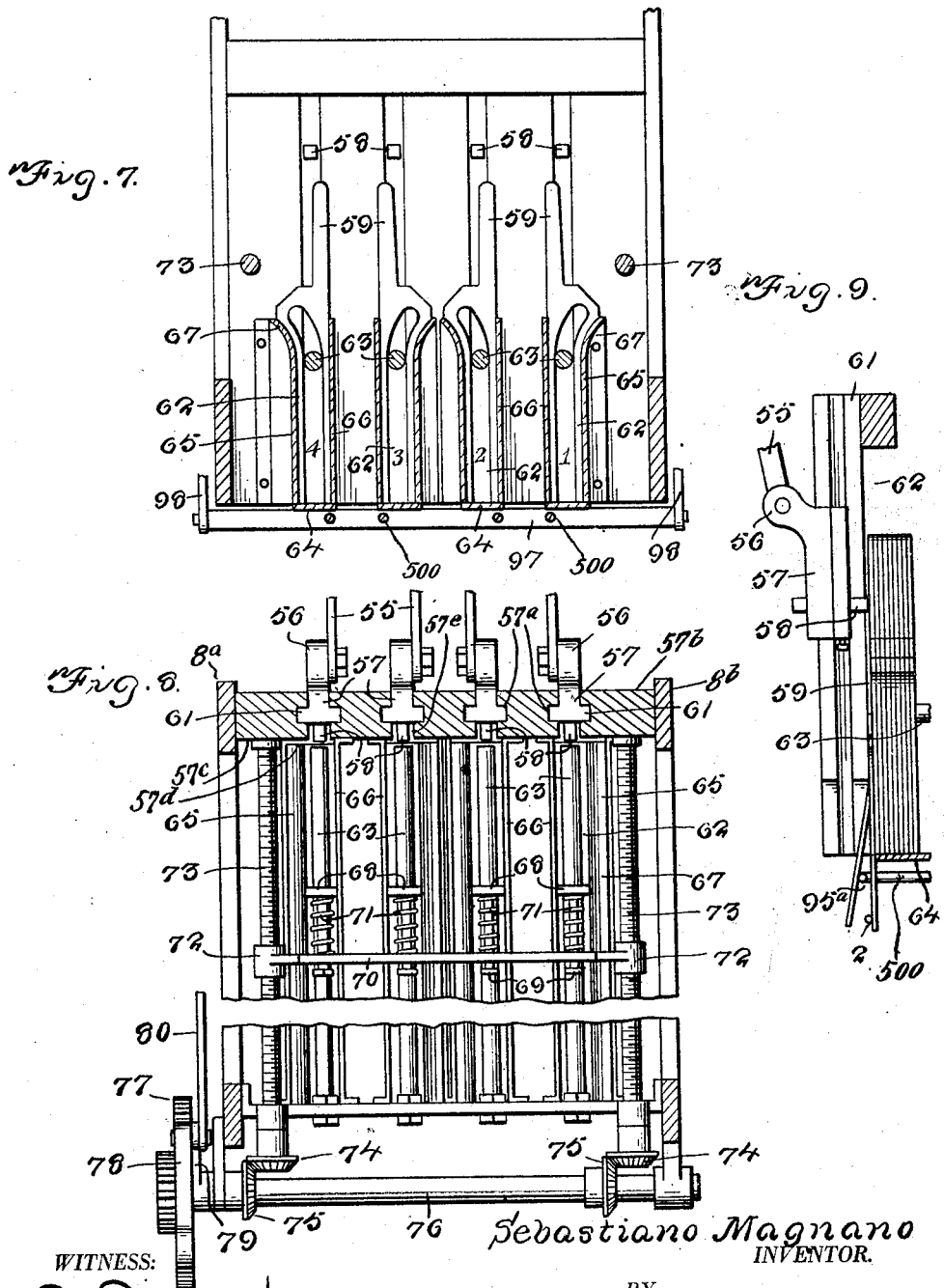

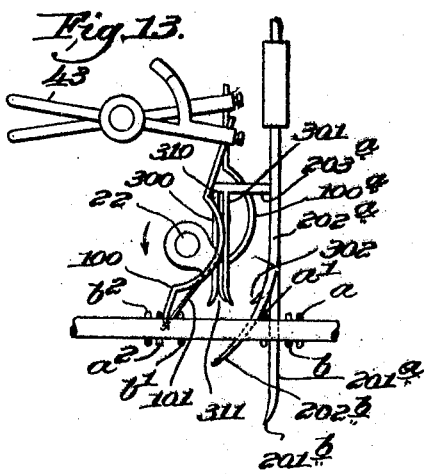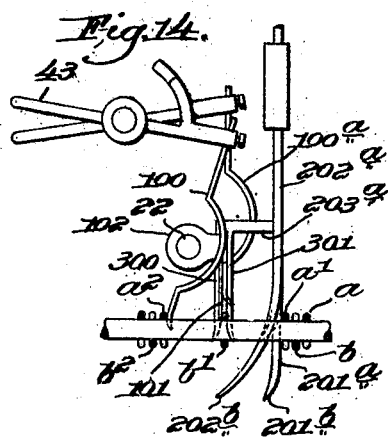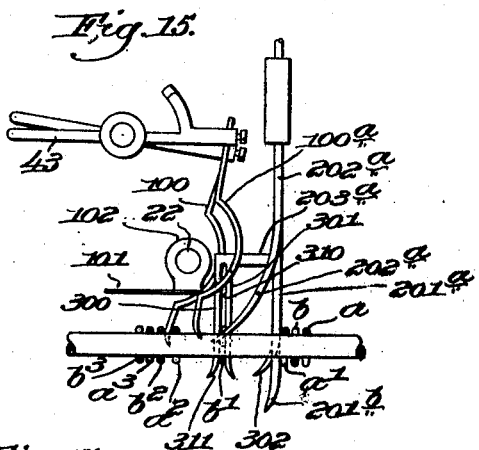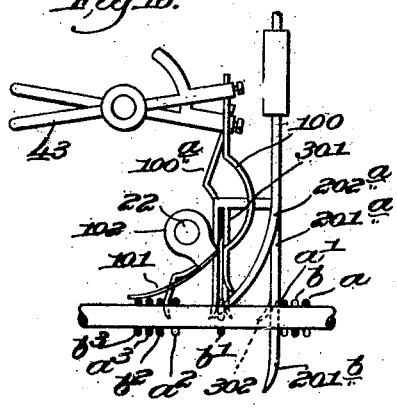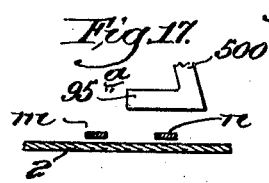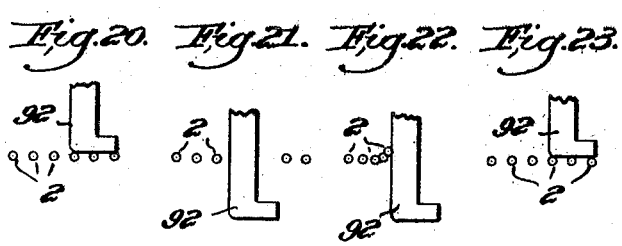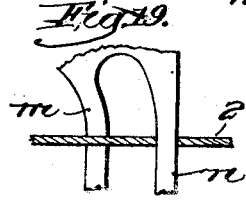

Patented Oct. 21, 1924.

1,512,704

UNITED STATES PATENT OFFICE.

SEBASTIANO MAGNANO, OF LAWRENCE, MASSACHUSETTS, ASSIGNOR TO MAGNANO CORPORATION, OF LAWRENCE, MASSACHUSETTS, A CORPORATION OF MASSACHUSETTS.

APPARATUS FOR APPLYING STOP-MOTION PINS TO WARP THREADS.

Application filed July 23, 1919. Serial No. 312,765.

*To all whom it may concern:*

Be it known that I, SEBASTIANO MAGNANO, a subject of the King of Italy, residing at Lawrence, in the county of Essex and State of Massachusetts, have invented new and useful Improvements in Apparatus for Applying Stop-Motion Pins to Warp Threads, of which the following is a specification.

This invention relates to mechanism for automatically presenting detached strand contacting members for engagement with successive threads or strands of a series and more particularly to a mechanism for depositing drop pins or detectors of the hair pin type upon successive yarns of a sheet of warps.

In the ordinary form of weaving loom as employed at the present time, the warp threads pass from the warp beam over the loom frame in a substantially horizontal plane and thence down to the cloth beam. The various threads of the warp sheet, between their points of connection to the warp beam and the cloth beam, pass through the eyes of heddles which serve to form the shed through which the shuttle is passed. The warp threads also pass through the reed dents, and alternating threads of the warp pass over and under suitable lease rods near the rear of the loom frame. The warp threads also commonly engage detector members of one type or another which usually comprise thin strips of sheet metal, the weight of which is supported by the unbroken thread. If however, the thread breaks, such sheet metal member is permitted to drop slightly, whereby suitable mechanism is actuated to cause the loom to stop.

In one form of such detector element, the thread passes through a closed eye similar to that in the heddle. As the number of threads in a sheet of warps may vary from approximately 1500 in a cotton or worsted warp to from 15,000 to 20,000 in a broad loom working upon silk, it is clearly evident that it must be a slow and laborious process to introduce each of such warp ends through the eyes in the stop motion detectors. In view of this difficulty, a type of metallic detector has come into very general use, in which, in place of a closed eye, an elongated open ended slot is employed. Detectors thus formed resemble somewhat an ordinary hair pin and are commonly known in the trade as "hair pin" detectors. Detectors of this form may, it is obvious, be placed upon the warp threads after the latter are in the loom and if desired, after the weaving operation has commenced. In fact, it is a common practice to omit the placing of such drop wires upon the threads until after the loom is started in order to avoid so far as possible unnecessary stopping of the loom with its attendant cessation of cloth production.

As the detectors are necessarily of substantial thickness, it is customary to arrange the detectors in several banks or series across the loom, the detectors which engage successive warp threads of a warp sheet being disposed in different banks,—for example the detectors engaging warp threads 1 to 4 may be disposed in banks 1, 2, 3, 4 or in banks 1, 3, 2, 4 or in other desired order. In certain looms the banks of the detectors as they hang upon the warp threads are disposed between rigid guide bars which prevent their swinging or swaying upon the warp threads, while in other types of loom the detectors straddle suitable guide bars disposed beneath the warps. It will be understood that in any case, such detectors are so arranged that their planes are nearly parallel to the general direction of the warp threads. Up to a recent date the placing of the hair pin detectors upon the warp threads has been performed entirely as a hand operation, and although this operation is much more rapid than that of drawing-in the warp ends through closed eyes, it is nevertheless laborious and very trying to the operator, especially when such detectors are placed upon silk warps, the fineness of which is such as to render them difficult to distinguish. The first known device for performing this operation automatically by mechanical means appears to have been disclosed in the patent granted to Dustin, No. 1,072,103, September 2, 1913.

In accordance with the disclosure of this patent, a frame is provided which may be placed transversely across the loom and above the warp sheet, such frame providing a support along which the mechanism may be traversed from one side of the loom to the other.

The mechanism itself comprises a single magazine in which a series of drop pins may be held vertically in a compact group. Suitable means is also provided for separating drop pins one by one from a group and permitting them to drop upon a properly positioned thread. In this machine the magazine is so arranged that the planes of the individual drop wires are transverse to the vertical planes of the warp threads. This machine also discloses means for picking off threads alternately from the upper and lower series of leased warps, such picking means comprising alternately operating, pointed bars which are pushed down between the foremost warps and thus serve to separate the forward warp from the next thread to the rear.

The mechanism is traversed by hand across the loom frame, automatically separating the foremost warp and applying a drop wire thereto as it passes.

One object of the present invention is to provide an improved machine of the type referred to and which may be mounted upon a loom frame without interference with the operation of the loom and which shall be capable of placing hair pin drop wires upon successive warps of the warp sheet rapidly and without substantial failure.

A further object is to provide in a machine of the type referred to a multiple-magazine in which a plurality of a series of drop wires may be arranged in compact order and from which the drop wires may be fed in alternation, thus permitting such drop wires simultaneously to be arranged in several parallel banks upon the warps.

It is a further object of the invention to provide a machine for feeding hair pin drop wires one by one from a magazine with the planes of the independent drop wires lying substantially parallel to the normal direction of the warp threads and in combination with such means, to provide for causing the legs of the drop wires to pass upon opposite sides of their respective warp threads as they are discharged from the magazine.

A further object of the invention is to furnish such a machine with accurately and rapidly acting means for separating threads from a series one by one, for a subsequent operation thereof. While a mechanism capable of carrying this object into effect may perhaps be well adapted for a more general use, as for example in yarn leasing machines, warp drawing machines or warp uniting machines, in a restricted sense the more immediate object is to provide in a machine for applying hair pin drop wires to warp threads, accurately and rapidly acting means for separating the warp threads of the series one by one for receiving the drop wires.

A further object of the invention is to provide means for accurately holding such a separated warp thread with certainty for the placing of the drop wires thereover and to provide means for moving the successive warp threads, after drop wires have been placed thereon, out of the path of the next succeeding drop wire whereby to avoid the improper placing of a second drop wire thereon.

Another object of the invention is to provide a machine of the above described type with automatically operated mechanism for causing such machine to traverse the sheet of warp threads from one to another, whereby to permit the placing of drop wires upon each successive thread of the warp throughout the entire width of the same.

A further object of the invention is to provide operative mechanism for the various instrumentalities included in the machine which shall be of a simple character, compact and little subject to failure or error in action.

While as above pointed out the mechanism as herein disclosed is particularly intended for applying drop wires to warp threads and for separating the warp threads for the application of such wires, it is apparent that certain of the elements and subcombinations thereof herein disclosed may well be found of utility in other relations and for specifically different purposes from those herein recited, and such use is contemplated as falling within the spirit of the present invention as expressed in the appended claims.

One practical embodiment of means for carrying into effect the above objects is illustrated in the accompanying drawings in which,—

Figure 1 is a side elevation of the right hand side of the apparatus.

Figure 2 is an elevation showing the opposite side of the apparatus.

Figure 3 is a front end elevation of the apparatus.

Figure 4 is a rear end elevation.

Figure 5 is a longitudinal vertical section taken through the apparatus in the plane indicated by the line 5—5 of Figure 3.

Figure 6 is an inverted plan view of the apparatus.

Figure 7 is a vertical transverse section taken through the multiple compartment magazine.

Figure 8 is a broken horizontal section illustrative of the pin magazines and their appurtenances.

Figure 9 is a detail vertical longitudinal section illustrating the mode of displacing the foremost pin in each magazine.

Figures 10 and 11 are detail views of the mechanism for progressing the device across the series of warp threads.

Figure 12 is a detail view of a thread separating device.

Figures 13, 14, 15 and 16 are diagrammatic side elevations of the thread separating and positioning devices, illustrating the sequence of operations in isolating a thread for receiving its drop wire;

Figures 17 and 18 are fragmentary, horizontal sectional views to enlarged scale illustrating the operation of springing a drop wire to permit it to slip over a thread;

Figure 19 is a fragmentary elevation to large scale illustrating the position of a drop wire relative to its thread in passing over the latter; and Figures 20, 21, 22 and 23 are diagrammatic views illustrating the operation of the detector device which controls the movement of the machine across the series of threads.

As best shown in Figure 3, my novel apparatus is supported upon frame bars or rails 1 which are designed to be arranged transversely of a loom above the sheet of warp threads, indicated by 2. These rails may be considered as constituting a part of the general mechanism herein disclosed as they are carried with the other parts thereof from loom to loom and serve as a base or support for the operative instrumentalities of the machine. The bars 3 are of the usual kind employed in looms of the Draper type for retaining the hair pin drop wires in proper position and over which such wires are straddled. While bars of this type are herein disclosed, it is to be understood that they form no part of the present invention and that retainer bars of other types such as those commonly employed in the Crompton-Knowles loom may be employed if desired. In the latter type of loom the bars serve merely as partitions to separate the various banks of drop wires, but do not support them. Lease rods of usual design are indicated at 4, such rods serving to divide the warps into upper and lower series, alternate warps lying in such upper and lower groups.

To facilitate the automatic progression of the machine along the bars or rails 1, the latter are provided at their inner sides, and preferably below their upper horizontal edges with racks 5, intermeshed with which are spur gears 6 on shafts 7 and 7ª journaled in the lower portion of the machine frame 8, adjacent to opposite ends of said frame. The shaft 7 is provided at one end with a hand wheel 9 for the manual movement of the frame 8 and the mechanism carried thereby.

If for any reason it should be desired to dispense with the automatic traverse of the machine, such racks and gears may be omitted without in any way affecting the general mode of operation of the more essential instrumentalities of the machine, which may in such case be moved from side to side of the loom by hand. Adjacent to the end of said shaft 7 opposite the hand wheel is a ratchet 10, Figures 2 and 3, for cooperation with which is provided a pawl 11 on an arm 12 that is loosely mounted on the shaft 7. Connected to the said arm 12 is a pitman 13 which is also connected to a crank pin on an arm 14 fixed upon the primary drive shaft 15 which preferably, though not necessarily, derives motion from an electric motor. The pawl 11 is pivotally connected to the arm 12 and the pitman 13, and is controlled by means hereinafter described. It will be apparent that while oscillation of the arm 12 will attend the revolution of the drive shaft 15, the shaft 7 will be rotated and the frame 8 and the mechanism thereon will be moved from the drive-shaft 15 only when the pawl 11 is permitted to engage the ratchet 10. The shaft 7 may however, be rotated at any time by manual operation of the hand wheel 9.

On the drive shaft 15 is a sprocket gear 16, and in the upper portion of the frame 8 is journaled a shaft 17, having fixed thereon a sprocket gear 18 and carrying four cams 19 relatively arranged as best shown in Figure 5, which also makes clear the configuration of each cam. Below the drive shaft 15 is a shaft 20 at one side of the machine (see Fig. 2) and on which is a loose idler sprocket gear 21, and below the shaft 20 is a shaft 22 on which is fixed a sprocket gear 23. A shaft 24 extends transversely across the frame at its front upper portion and fixed thereon at opposite ends are cranks 25. A sprocket gear 26 is also fast on shaft 24 and at 27 and 28 are idler sprocket gears supported upon stub shafts 27ª, 28ª respectively fixed in frame 8. Trained around the sprocket gear 18, the sprocket gears 27 and 26, the sprocket gear 23, the sprocket gear 21, the sprocket gear 16 and the sprocket gear 28, as best shown in Figure 2, is a sprocket belt or chain 29 through the medium of which the shafts 17, 22, 24, are driven from the drive shaft 15.

Pivoted on a shaft 30 carried by the frame 8 are vertically swinging lever arms 31, four in number, on which are upstanding bracket numbers 32, equipped with antifriction wheels 33 engaging the peripheral surfaces of the respective cams 19. A yoke 34 extends upwardly from the frame 8, and interposed between the transverse portion of the said yoke 34 and the several arms 31 are retractile springs 35 which serve yieldingly to hold the anti-friction wheels 33 in engagement with the surfaces of the cams 19.

Fixed on the drive shaft 15 and relatively arranged as best shown in Figures 2 and 10, are cams 40 and 41, and engaging the peripheral surfaces of the respective cams are laterally extending lugs 42 on rocker arms 43, which lugs 42 are held under yielding pressure against the cams by retractile springs 44 acting on the rear ends of arms 43. These cams are of complemental form having active portions 40ª, 40ᵇ, 41ª, 41ᵇ, respectively with interposed dwells 40ᶜ, 40ᵈ, 41ᶜ, 41ᵈ, respectively, the dwell portions of each cam being diametrically opposite one another, and the portions 40ᶜ, 41ᶜ being of greater extent than the portions 40ᵇ, 41ᵇ.

From the foregoing it will be apparent that oscillation of the arms 31 and the rocker arms 43, as well as rotation of the shaft 24, will attend rotation of the drive shaft 15.

The cranks 25 at the ends of the shaft 24 as best shown in Figure 3 each comprises the portions 25ª, the portions 25ᵇ and the portions 25ᶜ, Figures 1 and 3; said portions 25ª, 25ᵇ and 25ᶜ being integral or fixed with respect to each other. The triple cranks thus formed have their crank pins arranged substantially 90° apart. Said crank pins are connected through links 45, 46 and 47; 45ª, 46ª, 47ª, respectively, with members 201, 202, 203; 204, 205, 206, guided to reciprocate vertically in the machine frame and which serve to actuate the warp separating and positioning devices, all of which will be described at length hereinafter. Pivotally connected to and depending from the free ends of the arms 31 are rods 55 which are respectively pivotally connected at their lower ends to brackets 56 carried by the slides 57, Figures 3 and 9. Four drop wire magazines are arranged in a transverse series in the machine frame as appears in Figures 7 and 8. Each magazine is provided with a horizontal rod 63 that extends in the direction of the length thereof, and is fixed in the magazine. Each magazine may also comprise a bottom wall 64 and side walls 65 and 66. When the magazine is designed for holding the type of drop wires herein disclosed side walls 66 may be straight and the side walls 65 are flared at their upper ends as indicated by 67. It will also be noticed by reference to Figure 7, that the side walls 65 of the outer magazines are flared outwardly, while the side walls 65 of the inner pair of magazines are flared inwardly. If the magazine is to be used for holding drop wires of the straight sided type it is evident that both sides of the magazine might be straight and substantially parallel. Moreover, in such case, if desired the side and bottom walls of the magazine might be omitted altogether and the wires suspended from the guide rods 63. Movable in each magazine 62, is a follower 68, Figure 8, and each follower has two stems 69 (Fig. 5) that extend loosely through a cross-bar or plate 70 and are provided with heads in the rear of said cross-bar. Surrounding the stems 69 and interposed between the followers 68 and the cross-bar 70 are expansion springs 71 which have for their function to hold the followers 68 under yielding pressure against the pins 59 disposed in front of the followers. At its opposite ends the cross-bar 70 is provided with internally threaded sleeves 72 which constitute nuts engaging threaded shafts 73, whereby it will be observed that rotation of the said shafts in one direction will be attended by the simultaneous forward movement of the followers 68 whereby to compact the series of pins in the magazine and to gradually feed them toward the discharge end thereof. The slides 57 are guided for vertical reciprocation in dovetail slots 57ª in a plate-like head or support 57ᵇ suitably secured in the vertically extending members 8ª, 8ᵇ of the frame 8. The rearward face 57ᶜ of the head 57ᵇ is spaced from the forward end of the rod 63 a distance 57ᵈ very slightly greater than the thickness of one of the drop wires for use with which the machine is intended. The dovetail slots 57ª have vertically disposed centrally arranged extensions 57ᵉ opening at the rear face of head 57ᵇ, such extensions being of less width than the width of the drop wires and disposed with their vertical center lines substantially in the vertical central planes of the respective magazine compartments. Thus, as the drop pins are forced forwardly in the magazine the lateral portions of the front face of the foremost pins come into contact with the rear face 57ᶜ of the head 57ᵇ on either side of the slots 57ª, such head 57ᵇ thus serving as a stop or abutment for limiting the movement of the pins in the magazine. Passing through a suitable opening in each of the slides 57 is a selector pin 58, suitably secured in said opening, preferably in an adjustable manner. The pins 58 project to the rear of the slides 57 and pass through the extensions 57ᵉ of the slots 57ª, the rear ends of such selector pins extending beyond the rear wall 57ᶜ of the head 57ᵇ to a distance slightly less than the width of the space 57ᵈ or in other words slightly less than the thickness of one of the drop wires.

Fixed on the rear ends of the shafts 73 are miter gears 74 (Fig. 4) that are intermeshed with miter gears 75 fixed on a shaft 76 on which is also fixed a ratchet 77, Figures 2 and 8. For cooperation with the ratchet 77, and in order to turn the shaft 76 and feed the followers 68 forwardly in a step by step manner, I provide the pawl 78 pivoted to an arm 79 that is loose upon the shaft 76 and is oscillated through the medium of a link 80, Figures 1, 2 and 8, by an arm 81 on a shaft 82. The shaft 82 is provided at the opposite side of the machine frame with an arm 83, Figure 2, that is connected through a link 84 with a crank 85 fixed to the shaft 22, whereby the shaft 82 will be rocked and the shaft 76 will be turned, step by step, for the purpose before described. When the supply of pins 59 in the magazine is depleted, the bar 78 is disengaged from the ratchet wheel 77 and the shaft 76 is rotated in reverse direction through the medium of a crank 400 having a spur gear 401 fixed with respect thereto, said gear meshing with a spur gear 402 fixed on the shaft 76. This arrangement is best shown in Figure 1.

Fixed with respect to the pawl 11, as best shown in Figure 2 is a rod 90, and fixed to and depending from said rod 90 is a stem 91 having at its lower end a hammer 92 adapted to rest on a considerable number of warp threads, such number varying of course with the fineness of the warps employed. As herein illustrated, the hammer is shown as engaging a very limited number of yarns, as of course the relative size of the latter as respects the mechanism has been greatly exaggerated for clearness of illustration. Commonly the hammer would engage from forty to one hundred threads. The said stem 91 is provided with an abutment in the form of a collar 93, and passes loosely through a guide 94 on a rocker arm 95, the collar 93 being above the guide 94. The arm 95 is pivoted at 96 and is connected through a link 97 with one of the rocker arms 43, so as to derive oscillatory motion therefrom. Manifestly when the pawl 11 is supported out of engagement with the ratchet 10 by the imposition of the hammer 92 on a plurality of warp threads as stated, the frame or carriage 8 will remain at rest unless moved manually. When, however, the warp threads have all been removed from under the said hammer 92 and said hammer is permitted to move downwardly, the carriage 8 will be moved in the direction indicated by the large arrow at the bottom of Figure 2, which direction will hereinafter be referred to as rearwardly. The subsequent upward movement of the hammer 92 will be effected by the guide 94 bringing up against the abutment 93 on the stem 91. As clearly indicated in Figures 2, 11 and 20, the hammer 92 normally rests upon one or more of the warp threads 2 which as yet have not been supplied with drop wires. If desired the parts may be so proportioned that at each upward oscillation of the arm 95 the hammer will be lifted slightly from the threads. While this is not strictly necessary, it is desirable, as it tends to facilitate the restoration of the hammer to proper operative position after it has been permitted to fall. The threads are selected one by one and removed from beneath the hammer 92, and as the last thread is removed, the hammer is permitted to fall with the downward oscillation of arm 95 as indicated in Figure 21. The pawl 11 immediately engages a tooth of the ratchet wheel 10 and therethrough serves to impart a traverse movement to the machine frame rearwardly along its supporting rails 1. This movement will usually be of the order of one eighth of an inch and is sufficient to carry the hammer 92 into position for engagement with a fresh group of threads. As the machine moves rearwardly the hammer is moved upward simultaneously with or immediately after such movement of the frame. As the frame moves it carries the rear side of the hammer into engagement with the warp threads, thus crowding them back as indicated in Fig. 22. The rear side of the hammer may be straight and substantially vertical if desired, or if any other form not seriously interfering with its upward movement past the group of threads with which it contacts. As the arm 95 now oscillates upwardly and the lower face of the hammer rises above the plane of the warp threads, the bunched up threads spring forward and distribute themselves in the normal warp plane as indicated in Figure 23, thus serving to support the hammer as the hammer lifting arm 95 begins its next down stroke. As the hammer is raised to normal position, pawl 11 is raised from contact with ratchet wheel 10 and thus the movement of the machine frame ceases until the new group of threads beneath the hammer is exhausted.

Movable longitudinally of the carriage or frame 8 in a plane below the magazines 62 are opener rods 500, four in number (Figs. 1, 6, 17 and 18) and so denominated because they are provided at their forward ends with lateral arms 95$^a$, Figures 6 and 9, adapted to spring apart the legs of pins 59 after the manner shown in Figures 17 and 18. As the drop wire emerges from the magazine, it lies substantially in the plane of its respective warp thread and it is thus obviously necessary to flex one or both legs of the drop wire out of such plane in order to permit the legs to pass upon opposite sides of the yarn as they are projected toward it. This operation is clearly illustrated in Figs. 17 and 18 wherein the legs $m$, $n$ of the drop wires are shown in the normal plane before engagement by the arms 95$^a$ of the slide rods 500, and also with the leg $n$ pushed forwardly out of such plane by the action of the arm 95$^a$. In Fig. 19 is shown the result of such operation, the drop wire having nearly completed its movement and straddling over the thread. It will be understood that at the beginning of such flexing movement, the upper part of the drop wire is still gripped between the rear wall 57$^c$ of the head 57$^b$ and the next succeeding drop wire, thus permitting the arm 95$^a$ to flex forward the leg $n$ of the wire without substantially affecting the position of the other leg.

The said rods 500 are guided for reciprocating movement by passing through suitable openings in cross-bars 96ᵃ (Fig. 6), and have their heel ends connected to a crosshead 97ᵈ which, in turn, is connected by links 98, Figures 1, 2 and 3, with arms 99 and 81 on the shaft 82.

To each of the rocker arms 43 is secured a downwardly extending finger as 100, 100ᵃ, constituting a holdback for warp threads. As clearly indicated in Fig. 3, the two fingers 100, 100ᵃ are located upon opposite sides of the crossing point X of the leased warps. As will be clear from inspection of said figure the leasing of the warps divides them into two series, the threads of the series A passing above the lease rod 4 and below the lease rod 4ᵃ while the threads of series B pass below lease rod 4 and above lease rod 4ᵃ. The length of the hold back fingers 100, 100ᵃ is such that when in lowermost position they extend below the plane of the warps passing over the lease rods but do not contact with warps passing below said rods. As alternate warp threads lie in series A and B respectively it will be clear that, if for example, the foremost thread belongs to the B series and the hold back finger 100 is down as shown in Fig. 3, while the hold back finger 100ᵃ is up and entirely out of contact with the threads, it will only be possible to pick off and separate the foremost B thread from the entire mass of warp threads. This thread is of course entirely free, hold back 100ᵃ being up, but the next thread, being the foremost A thread is held back by finger 100. As the second B thread crosses behind the front A thread, it cannot escape until the latter thread has been released. Thus it is clear that with the parts positioned as shown in Fig. 3, it is only possible to separate a single thread, and that the foremost B thread, from the entire mass of warps. As the hold back fingers 100, 100ᵃ are moved down into operative position alternately by operation of cams 40, 41, as above described, it is clear that the foremost threads of the series A and B respectively, are alternately released but that in each case, but a single thread is free for separation from the warp sheet.

For separating the released foremost thread, whether from series A or B, a thread separator or picker is employed. This picker comprises a flexible blade 101 (Figs. 3 and 12) secured to a collar or bracket 102 fixed on shaft 22. For properly holding the separated threads for the reception of the drop wires, and to convey the loaded warps away from said position, the following mechanism is employed.

To the lower ends of members 201, 206, are secured thread retainers 201ᵃ, 206ᵃ, respectively and to the lower ends of members 202, 205 are secured thread pushers 202ᵃ, 205ᵃ respectively. To the innermost members 203, 204 respectively are secured brackets 203ᵃ, 204ᵃ having downwardly extending fingers 300, 301, 302, 300ᵃ, 301ᵃ, 302ᵃ, 303 respectively.

As the thread retainers, pushers and positioners upon opposite sides of the machine are substantially alike, and are operated simultaneously and by substantially like mechanism and for the same purpose it is necessary to describe but one set of these members in detail. As clearly indicated in Figs. 13 to 16 the thread retainer 201ᵃ is a substantially straight vertically disposed bar having its lower end terminating in a sharp edge directed somewhat to the rear as indicated at 201ᵇ.

The thread pusher 202ᵃ comprises a downwardly directed rod having its lower end curved toward the rear to provide an upwardly and forwardly extending cam surface 202ᵇ. The thread positioner comprises the substantially horizontal rearwardly extending bracket 203ᵃ having depending from its front end the finger 302 curved rearwardly at its lower extremity. From the central portion of the bracket 203ᵃ a pair of spaced fingers 300, 301, extend downwardly providing between them a narrow vertical slot 310. The lower ends of the fingers 300, 301 are curved in opposite directions thus providing a flaring mouth 311 leading to the slot 310. The width of the slot 310 may be substantially equal to the diameter of the warp threads with which the machine is to be employed. If desired the lower ends of the fingers 301, 302 may be united, this however being unessential.

To the rear end of one or both of the thread positioner brackets 203ᵃ, 204ᵃ another depending finger as 303 (Fig. 1) having a forwardly directed lower extremity may be secured. This finger serves as a retainer for the unseparated series of threads and while useful under some circumstances is not necessary to the successful operation of the mechanism and is not indicated in Figs. 13 to 16.

The operation of the machine in general is as follows, it being understood that the warp threads are in position in the loom frame and that the loom is ready to operate. In fact, if desired, the loom may be in operation for weaving during the operation of the machine herein disclosed.

The warps being stretched across the loom frame as above stated, the rail members 1 are placed transversely across and above the warps and secured to the loom frame in any desired manner. The machine herein disclosed is then set upon the rails at the extreme right hand side of the loom, that is to say, the front of the wire placing machine is directed toward the right hand side of the loom frame. The several compartments of the magazine are now supplied with drop wires which are compacted by the follower members 68. The machine is now moved rearwardly along the rails by means of the hand wheel 9 until the hammer 92 is brought above the right hand warp threads of the series. Power may now be applied to the drive shaft of the machine whereupon the various operative instrumentalities will be set in motion.

Referring now to Figs. 13 to 16 inclusive as illustrative of the thread separating and positioning devices, it may be stated that Figure 13 shows the operation as having proceeded to a point where warp threads $a$, $b$ and $a'$ have been provided with drop wires. The threads designated $a$, $a'$, etc., are intended to indicate those of the A series as shown in Fig. 3 while the threads $b$, $b'$, etc., are those of the B series of said figure, that is to say, the threads indicated by $a'$ $a'$ pass over the front lease rod 4 of the loom while the threads $b'$ $b'$ pass over the rear lease rod $4^a$ of the loom. In Fig. 13 it will be noted that the hold-back finger 100 is in engagement with a thread $a^2$ of the A series thereby holding this thread back and preventing its separation from the mass of warp threads. As the next thread $b^2$ crosses behind the thread $a^2$ at the crossing point X of the lease it is of course, unable to escape and the same is true of all preceding threads of the series. The hold-back finger $100^a$ is however, in inoperative position and thus the foremost thread $b'$ of the B series is free from restraint. The separator blade 101 is shown as sweeping downward in the direction of the arrow, Fig. 13, and as having moved over the threads $a^2$, $b^2$, without affecting the latter. The blade has however, begun to move the thread $b'$ to the right. In the same figure the thread retainer $201^a$ is shown in position for preventing the threads $a$, $b$, which already have received their drop wires from snapping back toward the unloaded series from which they have been separated. This retainer device as indicated in this figure is on its way up. In the same figure the thread pusher device $202^a$ is moving downwardly and is shown as engaging the thread $a'$ which has just received its drop wire. As this pusher device moves downwardly and the retainer device $201^a$ moves upwardly the thread $a'$ will be pushed in a transverse direction into the series including the threads $a$, $b$. Figure 14 shows the operation as having proceeded somewhat further, the thread $a'$ having been pushed over against the thread $b$ and the retainer $201^a$ having moved downwardly again to retain such thread in position. The thread pusher $202^a$ is now moving upwardly. The separator blade 101 has moved to a sufficient extent to bring the thread $b'$ into the vertical plane of movement of the thread positioner comprising the spaced arms 300, 301.

This device is shown in Fig. 14 as moving downwardly and having just engaged such thread whereby to hold it for reception of a drop wire.

In Fig. 15, the thread retainer $201^a$ is shown as still retaining the thread $a'$. The thread pusher is indicated as beginning the downward movement, its lower extremity passing behind the thread $b'$ ready for engagement therewith. The positioner is now going up and about to release the thread $b'$ which has received its drop wire from the wire placing device. The hold-back member 100 is just swinging away from its operative position while the hold-back member $100^a$ has been moved to operative position. The exchange of the hold-back members has resulted in the release of the foremost thread $a^2$ of the A series, while the foremost thread $b^2$ is held against separation from the other threads by the finger $100^a$. The holding back of the thread $b^2$ now serves to prevent movement of any of the threads such as $a^3$, $b^3$ lying to the rear thereof. The separator blade 101 is shown as having completed substantially three-fourths of a revolution and as being about to engage the warp threads in the plane of the crossing X.

In Figure 16, the parts are shown in substantially the position of Fig. 15 with the exception that the blade 101 has moved slightly further and is now engaging warp threads such as $a^3$, $b^3$, the blade being flexible and dragging freely over these threads. As the thread $a^2$ is free of restraint however, the blade will after passing thread $b^2$, snap down between the threads $a^2$, $b^2$ in the manner indicated in Figure 13 and the operation as above outlined will be repeated.

At each rotation of the blade 101 a picker member 58 will be moved downwardly by its corresponding cam 19 and as indicated in Fig. 9, will serve to positively push downwardly the foremost drop wire from its particular magazine compartment. As the drop wire begins to move downwardly, the corresponding finger $95^a$ is moved forwardly to spring one of the legs of the drop wire out of its normal plane as clearly indicated in Figs. 9 and 18. The thread is at this time held at opposite sides of the machine by the thread positioner devices and directly below the path of the descending drop wire which is thus caused to straddle such thread in the manner clearly indicated in Fig. 19, the plane of the drop wire being substantially parallel to the axis of the thread. As each thread is provided with a drop wire such thread is moved by the pusher devices out of the path of the descending drop wires and the loaded threads are held against backward movement by the retainers. As the machine continues to operate the pawl 78 actuates the ratchet wheel 77 and through the connections described turns the screw threaded rods 73, thus slowly moving the follower plates 68 toward the front of the machine and feeding the drop wires along the magazine compartments toward their discharge ends. As the machine continues to pick off warp threads from the unloaded series it may gradually be progressed along the rails by manipulation of the hand wheel 9 in order to permit the separator blade 101 to operatively engage fresh threads of the series. If however, it is desired to have the machine operate automatically, the hammer device 92 may be employed, such device as above stated resting at the beginning of the operation upon a series of the unloaded threads. The hammer may be of sufficient extent to rest upon from 40 to 100 threads, such being approximately the number that the separator device can reach without movement of the mechanism along the track. It being assumed now that the group of threads beneath the hammer is exhausted, the hammer will drop as indicated in Fig. 21 whereupon the pawl 11 drops into a tooth of the ratchet wheel 10. The next vibration of the pawl serves to move the ratchet wheel and thereby to traverse the machine along its rails a distance substantially equal to the length of the hammer. Such length may be of the order of 1/8 of an inch. As the hammer moves laterally with the machine while in its lower position, it of course, tends to compact or pile up the adjacent warp threads as indicated in Fig. 22. As the arm 95 is continually oscillating however, the member 94 serves to lift the hammer 92 almost immediately after its dropping, carrying it to a point slightly above the plane of the warps. As the warps 2 are under some tension they immediately snap beneath the hammer as indicated in Fig. 23 and upon the downward oscillation of the member 95, the hammer again rests upon the warp threads. The pawl 11 is thus rendered inoperative and the machine remains at rest until another exhaustion of threads beneath the hammer.

While the above machine has been illustrated as for use with drop wires of a specific shape, it is clearly evident that it is not, in its general mode of operation, dependent upon the particular type of drop wire employed, as drop wires having parallel edges or edges of any desired figuration may be placed on the warp threads by the machine, it being simply necessary to change the shape of the magazine walls to conform to such wires. It is furthermore evident that while certain specific operative connections have been disclosed whereby to transmit motion from the main drive shaft to the several operative instrumentalities, other and equivalent connecting mechanisms might be substituted without in any manner departing from the spirit of the present invention. It is also clear that changes in the specific shapes and relative proportions of the various thread manipulating devices as well as changes looking toward the proper adjustment of the various mechanisms may be embodied in the structure without in any manner changing the fundamental mode of operation of the same.

I claim:

1. In combination with a mechanism for applying drop wires to warp threads, supporting means extending transversely of the warp threads, said mechanism being movable longitudinally of said supporting means, and automatic devices operating in accordance with the presence or absence of warps to control the movement of said mechanism along said supporting means.

2. In combination with a frame provided with mechanism for applying drop wires to warp threads, a pair of rails constructed and arranged temporarily to be positioned transversely above the warp threads in a loom, truck wheels supporting the frame, said wheels resting upon the tracks, manually operable means for propelling the frame with its mechanism along the tracks, motive means upon the frame, and devices actuable by the motive means for intermittently progressing the frame along the tracks, the operation of said devices being in accordance with the presence or absence of warp threads.

3. In combination with mechanism for engaging drop wires with warp threads, supporting rails mountable transversely of a loom frame, a carriage for said mechanism movable along said rails, and automatically operating devices including pawl and ratchet mechanism for intermittently progressing said carriage along said rails.

4. In combination with mechanism for applying drop wires to warp threads stretched in a loom, said mechanism being supported by a frame, a pair of rails constructed and arranged temporarily to be supported in the loom transversely of the warp threads, means for supporting the frame with its mechanism comprising a plurality of shafts journaled in the frame, wheels mounted upon said shafts and resting upon the rails, a hand wheel secured to one shaft for rotating the latter whereby manually to propel the frame along the rails, a motor mounted upon the frame, and means including pawl and ratchet mechanism for transmitting motion from the motor to one of said shafts.

5. In combination with mechanism for applying drop wires to a horizontally disposed series of warp threads and comprising a frame, a pair of supporting members adapted to extend in parallel relation and transversely above the warps, the upper surfaces of said members being provided with rack teeth, a pair of shafts journaled in the machine frame, gear wheels secured to said shafts and engaging said rack teeth, said gear wheels constituting trucks for supporting said frame, and pawl and ratchet means for rotating one of said shafts whereby intermittently to progress the mechanism along the rails.

6. In combination with mechanism for applying detached elements to a succession of threads lying in substantially a single substantially horizontal plane, a pair of guide members extending transversely of and above said threads, a pair of shafts provided with wheels engaging said guides and serving to support said mechanism, a ratchet wheel fast to one of said shafts, a constantly oscillating pawl engageable with said ratchet for turning the same, and a detector member operative, by engagement with threads, normally to hold said pawl out of engagement with said ratchet wheel.

7. In combination with mechanism of the class described, means for automatically moving said mechanism transversely across a substantially horizontal series of threads comprising a ratchet wheel, a pawl member engageable therewith, means for imparting movement of oscillation to said pawl, an arm outstanding from said pawl, and a thread engaging hammer secured to said arm, said hammer when supported by a thread of the series serving to prevent operative engagement of said pawl with the ratchet wheel.

8. In combination with mechanism for manipulating strands, means for imparting bodily progressive movement to said mechanism across a series of strands, said means comprising a ratchet wheel mounted upon a shaft, a lever arm pivoted to oscillate about the axis of said shaft, means for constantly oscillating said arm, a pawl member pivotally supported upon said arm and engageable with the ratchet wheel for turning same, a thread engaging hammer member secured to said pawl and a lifter member for moving said hammer in a direction whereby to disengage said pawl from the ratchet wheel.

9. In combination with mechanism for placing drop wires upon warp threads stretched in a loom frame, means for supporting such mechanism for bodily movement transversely of and above said threads, and devices for automatically imparting such movement, comprising an intermittent drive mechanism and means for controlling the operation thereof, said means including a hammer device normally resting upon the warp threads, but movable freely below the plane of said threads upon the absence of threads beneath the same, and means for restoring said hammer to a position above the warp plane.

10. In combination with mechanism for applying drop wires to warp threads stretched in a loom frame, supporting means arranged to permit movement of said mechanism across said warp threads and above the same, and automatically actuating devices for producing such movement, such devices comprising a ratchet wheel, a constantly reciprocating pawl engageable with said wheel for turning the same, a detector member secured to said pawl and normally resting upon threads of the warp whereby to hold said pawl out of engagement with its wheel, and a constantly moving member engageable with an element of said detector and serving intermittently to lift the same slightly from the warp threads but at intervals permitting the free dropping of the same to a point below the plane of the warp threads in the absence of the latter, said moving member being constructed and arranged to restore said detector member to a position above the warp plane for engagement with a new set of warp threads.

11. In combination with a mechanism of the class described, means for traversing such mechanism across a series of threads, a detector engageable with said threads for controlling the operation of said means and an oscillating element engageable with said detector and constructed and arranged to lift said detector at intervals from the warp threads.

12. In a machine of the class described, a magazine for supporting drop wires of unsymmetrical form having opposite edges of unlike contour, said magazine comprising spaced side walls and a bottom wall, one of said side walls being substantially straight and the other of said walls having its upper portion flared outwardly, thereby forming channels of unsymmetrical cross section corresponding to the shape of the drop wires.

13. A magazine device for holding a plurality of series of thin elements of sheet material in compact face to face relation comprising a pair of substantially straight and parallel side wall members, bottom members extending from said side members substantially at right angles thereto and in opposite directions, and other side wall members secured to the opposite outer edges of said bottom wall members and extending upwardly in spaced relation to said first named wall members and being curved outwardly therefrom at their upper portions.

14. In combination in a magazine device for holding series of like elements of unsymmetrical outline in face to face relation, means forming a plurality of channels for the reception of said elements, said channels being substantially parallel one to the other, and being of unsymmetrical cross-section corresponding to the outline of the elements to be received therein.

15. A magazine device for supporting bifurcated sheet metal elements in compact series comprising a guide rod over which said elements may be straddled, and an abutment member spaced from one end of said rod a distance substantially equal to the thickness of one of said elements.

16. In combination in a machine of the class described, a magazine for drop wires of the hair-pin type comprising a guide rod supported at one end to extend in a substantially horizontal direction and constructed and arranged for insertion between the legs of said drop wires, and means spaced from the free end of said guide rod and forming an abutment for limiting the movement of such drop wires.

17. In a machine of the class described, a magazine for thin sheet metallic elements and comprising side and bottom walls, and a longitudinally extending guide bar, and an abutment member at an end of said magazine, said bottom wall and guide rod terminating at a distance from said abutment substantially equal to the thickness of one of said sheet metal elements.

18. In a magazine device for use in holding drop wires for warp stop motions, spaced parallel walls defining a plurality of substantially parallel channels for the reception of such drop wires, and a guide rod extending longitudinally of and within each of said channels.

19. A magazine device for use in a drop wire placing machine, comprising side and bottom walls forming a channel for receiving drop wires, a guide rod extending longitudinally within said channel, and an abutment member spaced from one end of said channel forming members and from the end of said guide rod a distance substantially equal to the thickness of one of such drop wires.

20. In a magazine device for use in machines of the character described, in combination, a guide rod supported at one extremity and having its opposite extremity free, a spring pressed follower movable in a path substantially parallel to said guide rod, and an abutment member spaced from the free end of said guide rod and against which a series of drop wires slidably guided by said rod may be pressed by said follower.

21. In a machine for feeding detached loom elements one by one, a magazine for such elements comprising a longitudinally extending guide member, a pair of screw threaded rods extending substantially parallel to said guide member, a plate having threaded engagement with the respective rods, a pair of headed pins extending loosely through openings in said plate, a follower fixed to the forward ends of said pins, springs interposed between said follower and plate, and means for imparting simultaneous motion of rotation to said screw threaded rods.

22. In a magazine device for holding sheet metal loom elements in a plurality of series, in combination, a plurality of guide members for such elements arranged in substantially parallel relation, a pair of screw threaded rods extending substantially parallel to said guide members, a plate having threaded engagement adjacent its opposite ends with the respective rods, said plate extending transversely across the several guide members, pairs of headed pins corresponding to each of said guide members and extending loosely through openings in said plate, a follower secured to the forward ends of each pair of said pins, springs interposed between each of said followers, and said plate, and means for imparting simultaneous motion of rotation to said screw threaded rods.

23. In a machine of the class described, a frame, a magazine extending from front to rear of said frame, a rotatable shaft having a crank thereon, a shaft journaled in the frame and having a ratchet wheel thereon, a pawl cooperating with the ratchet wheel, connections between said crank and pawl for actuating the latter to drive the ratchet wheel, and means actuated by said last named shaft for feeding forward articles held within the magazine.

24. In a machine useful in the textile art for separating thin metallic elements one by one from a compact series, a magazine for such elements, an abutment member associated with the discharge end of said magazine, said abutment member comprising a plate having a dove-tail slot therein, a slide member reciprocable in said slot and constrained thereby to move in a path substantially parallel to the plane of the foremost element of the series, and a picker finger rigidly secured to said slide member and projecting through an extension of said slot for engagement with the endmost of the elements carried in the magazine.

25. In combination in apparatus for manipulating detached bifurcated thread engaging elements, a support for a thread, and means for slidably advancing such an element with its bifurcated portion directed toward said thread to take over the same.

26. In a machine for manipulating detached, sheet metal drop wires for looms, a magazine for holding such drop wires in compact, face to face series, and a picker provided with a drop wire engaging element reciprocable in a rectilinear path substantially parallel to the plane of the forward drop wire and engageable with the edges of successive drop wires for moving them from normal position in the magazine into thread engaging position.

27. In a machine of the class described, a magazine for holding a series of drop wires in compact face to face relation, a fixed stop for engaging the endmost wire of said series, said stop having an elongate slot therein, a picker element protruding through said slot and engageable with the upper edge of said endmost drop wire, and means for reciprocating said picker in a rectilinear path substantially parallel to the plane of the endmost drop wire.

28. An organized mechanism to apply stop motion pins to warp threads, comprising means to move pins one by one toward their respective warp threads, and means to position the threads for the application of said pins.

29. An organized mechanism to apply stop motion pins to warp threads, comprising means to move a hairpin drop wire in an endwise direction toward its thread while maintaining it in substantial parallelism with the vertical plane of said thread, and means to position the warp thread for the application of the pins.

30. In combination in a textile machine provided with means for separating successive warp threads one by one from a series and for holding such separated threads in receiving position, a multi-compartment magazine for holding a plurality of series of thin warp engaging elements of sheet material in compact relation, a reciprocable picker associated with each of the magazine compartments for picking off the endmost element therein, and drive mechanism for the several picker devices constructed and arranged to move such devices in predetermined sequence to deliver a warp engaging element to each successive warp thread as the latter is held in receiving position.

31. In a machine for applying drop wires to warp threads, means for positioning the threads to receive the drop wires, a magazine for such drop wires having a plurality of compartments, a reciprocable picker device associated with each of said compartments, levers for actuating the same, and cam means for operatively moving each of said levers.

32. In combination in a machine for placing drop wires upon warp threads, means for positioning the threads to receive the wires, means for holding a plurality of series of drop wires, a picker member for picking off wires from each of said series, and means for moving said picker members, said means comprising swinging lever arms connected respectively to the several picker members, a rotatable shaft, and a plurality of cams on said shaft, said cams being constructed and arranged for operative engagement respectively with the several lever arms.

33. In combination in a machine of the class described, a magazine comprising a plurality of compartments for drop wires, a reciprocable picker associated with each of said compartments, a rotatable shaft, a plurality of cams upon said shaft corresponding in number to the several pickers, said cams being spaced equally about said shaft, and connections operable by said cams for actuating the respective pickers.

34. An organized mechanism to apply stop motion pins to warp threads, comprising means to move a pin toward its warp thread while maintaining it substantially parallel to the vertical plane of said thread, means to open the pin to permit it to straddle its thread, and means to position said warp thread for the application of the pin.

35. In a machine for use in the textile art for manipulating hair pin like elements of flexible material and having spaced legs, means for moving such an element in a predetermined path with the open end thereof in advance, and means engageable with one of the legs of such advancing element whereby to spring its extremity out of its normal position.

36. In a machine for engaging drop wires of the hair-pin type with warp threads, means for supporting a warp thread, guide means for constraining a drop wire to move in a predetermined path transversely of the thread and with its plane substantially parallel to the axis of the thread, means for moving a drop wire along said path, and means for springing one leg of the advancing drop wire out of its normal plane.

37. In an apparatus for suspending a bifurcated metallic element upon a strand lying substantially in the plane of said element, means for advancing said element with its open end presented toward said strand, and means operable upon one leg of said element for causing its extremity to move out of its normal plane.

38. In an apparatus for suspending a bifurcated metallic element upon a strand lying substantially in the plane of said element, means for advancing said element with its open end presented toward said strand, and mechanically actuated means engageable with one leg of said element for causing its extremity to move out of its normal plane.

39. In combination in a machine of the class described, means for feeding a drop wire of the hair-pin type in a direction to suspend it upon a thread, and a device for springing one of the legs of said drop wire out of its normal plane as it approaches said thread, said means comprising a slide bar having an element engageable with one leg of said drop wire and means for moving said slide bar to engage said element with a leg of the drop wire as the latter is advanced by the feeding means.

40. In a machine of the class described, in combination, means for advancing a bifurcated drop wire and mechanism for flexing one leg of the advancing drop wire out of its normal plane, said mechanism comprising a bar, means for guiding said bar to slide in a path substantially perpendicular to the plane of said drop wire, and a foot member carried by said bar and constructed and arranged to be brought into forcible engagement with a leg of said advancing drop wire.

41. In a machine for suspending drop wires of the hair-pin type upon warp threads, means for advancing drop wires one by one in succession from a plurality of magazines, a plurality of devices corresponding in number with said magazines and constructed and arranged for flexing a leg of each such drop wire out of its normal plane as the wire is advanced, means for guiding said flexing devices, and means for simultaneously advancing said flexing devices into operative position, said latter means being arranged to move said flexing devices into operative position in accordance with the discharge of a drop wire from any of said magazines.

42. In a machine for advancing drop wires of the hair-pin type successively from a plurality of magazines, a plurality of devices corresponding in number to said magazines and slidable in paths substantially perpendicular to the planes of corresponding and advancing drop wires, means securing said devices together for simultaneous movement and means operative in time with the discharge of a drop wire from each of said magazines for advancing said combined devices whereby to press one of said devices into forcible engagement with a leg of a corresponding advancing drop wire.

43. In a device of the class described, a support for a series of warps, means for separating a warp from said series, means for positioning a warp so separated for engagement with a detector, a holder for detectors, means to move a detector supported in said holder toward said separated warp, means to move a warp after engagement with a detector to form a second series, a shaft, a plurality of cranks thereon, and devices connecting said cranks with said respective warp manipulating means whereby to actuate the latter.

44. In a machine for engaging detached elements with a thread, means for moving said element toward the thread, and means arranged at either side of said moving means for positively positioning said thread for engagement with said element.

45. In a machine for suspending thin metal devices upon successive threads of a series, mechanism for moving such devices in succession into position for engagement by a thread of the series, means for separating threads one by one from the series, and means located at either side of said mechanism for positioning said thread for engagement with its corresponding device.

46. In a machine for placing hair pin drop wires upon warp threads, a device for advancing a wire toward a thread, means located at each side of said advancing means for positively positioning said thread to receive said wire and means also located at each side of said advancing means for imparting a transverse movement to the thread after receiving its wire.

47. Apparatus for the purpose described, comprising a pin magazine to support in upright position a group of pins above a sheet of warp, means to separate the foremost pins in the magazines in regular sequence and to move such separated pin in a direction crosswise of the plane of the warp sheet, and means to position the warp threads to receive the pins so separated and discharged.

48. Apparatus for the purpose described, comprising pin magazines to support in upright position groups of pins above a sheet of warp, means to separate and discharge the foremost pins in the magazine in regular sequence crosswise of the sheet of warp, and means to position the warp threads to receive the pins so separated and discharged, a carriage carrying said magazines, pin separating, pin discharging, and thread positioning means, all movable transversely above the sheet of warp, and means put in operation by manipulation of warp threads to move the carriage a predetermined distance transversely of the sheet of warp.

49. Apparatus for the purpose described, comprising a plurality of pin magazines for supporting thin bifurcated sheet metal pins above a sheet of warp with the planes of the individual pins extending parallel to the threads of the warp sheet, means for separating and discharging the foremost pins in the magazines in regular sequence, means to open the pins, and means to position the warp threads to receive the pins so separated, discharged and opened.

50. Apparatus for the purpose described, comprising pin magazines to support in upright position groups of pins above a sheet of warp, means to separate and discharge the foremost pins in the magazines in regular sequence crosswise of the sheet of warp, means to open the pins, and means to position the warp threads to receive the pins so separated, discharged and opened, a carriage carrying said magazines and said several means, and means put in operation by manipulation of warp threads to move the carriage a predetermined distance transversely of the sheet of warp.

51. Apparatus for the purpose described, comprising pin magazines to support in upright position groups of pins above a sheet of warp, means to separate and discharge the foremost pins in the magazines in regular sequence crosswise of the sheet of warp, means to open the pins, and means to position the warp threads to receive the pins so separated, discharged and opened, a carriage carrying said magazines and said several means, means for moving the carriage transversely of the sheet of warp and including a ratchet and a pawl through which the driving connection is established and interrupted, a hammer arranged to be supported by a group of warp threads and to gravitate when said threads are displaced, and a connection between said pawl and hammer.

52. Apparatus for the purpose described, comprising pin magazines to support in upright position groups of pins above a sheet of warp, means to separate and discharge the foremost pins in the magazines in regular sequence crosswise of the sheet of warp, means to position the warp threads to receive the pins so separated and discharged, a carriage carrying said magazines and said several means, and means put in operation by manipulation of warp threads to move the carriage a predetermined distance transversely of the sheet of warp.

53. Apparatus for the purpose described, comprising a movable frame or carriage, a group of pin magazines arranged side by side, followers movable in said magazines, a primary driver, means actuatable thereby for advancing the followers in concert, means to discharge the foremost pins in the magazines in regular sequence and actuatable by the primary driver, means actuatable by the primary driver to position the warp threads to receive the pins so discharged, means actuatable by the primary driver to open the pins, and means actuatable by the primary driver and controlled by manipulation of warp threads to move the frame or carriage a predetermined distance transversely of the sheet of warp.

54. Apparatus for the purpose described, comprising a frame, a primary driver carried thereby, rotary means for moving the frame and including a ratchet and a pawl complementary to the ratchet, a shaft in the frame and equipped with cams, a third shaft in the frame and equipped with three-part cranks, warp-thread positioning elements connected with the said parts of the crank, a fourth shaft, a resilient warp thread-engaging-finger revoluble with the fourth shaft, a hammer connected with said pawl and adapted to be supported by warp threads, rocker arms, cams on the primary driver for actuating said arms, warp thread holders connected to said arms, means connected with one of said arms to raise said hammer, means to open pins discharged from the magazine, and a driving connection intermediate of the primary driver and the cam shaft, the crank shaft and the fourth shaft for driving said shafts, means for actuating the hammer-raising means, and means for actuating the pin-opening means.

55. In combination with mechanism for applying detached loom elements to warp threads, means supporting said mechanism to allow it to move transversely across a sheet of warp threads, and automatic means for so moving said mechanism comprising a pawl and ratchet device.

56. In combination with mechanism for engaging drop wires with warp threads, a carriage for said mechanism movable transversely across the threads, wheels for the carriage, a ratchet connected to one of the wheels, and a constantly reciprocating pawl engageable with the ratchet.

57. In a machine for feeding detached loom elements one by one, a magazine for such elements comprising an elongate guide member, a screw threaded rod extending substantially parallel with said guide member, a plate having threaded engagement with the rod, and means for turning the rod to advance the plate longitudinally of the magazine.

In testimony whereof I affix my signature.

SEBASTIANO MAGNANO.